Nov. 21, 1933.   E. H. CHANDONIA   1,935,941
BAKING EQUIPMENT
Filed Feb. 8, 1933
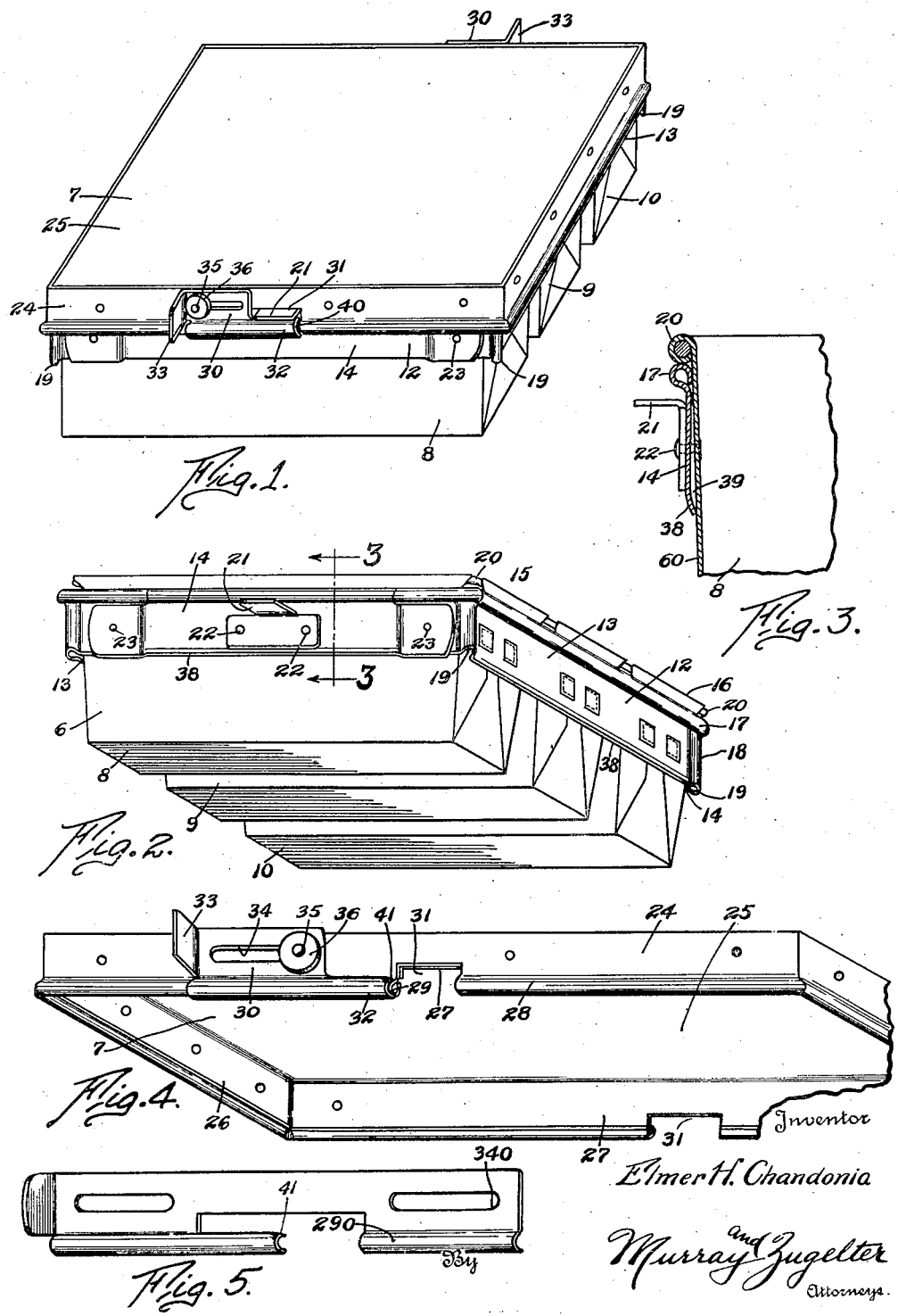

Patented Nov. 21, 1933

1,935,941

UNITED STATES PATENT OFFICE 1,935,941

BAKING EQUIPMENT

Elmer H. Chandonia, Cincinnati, Ohio, assignor to The Lockwood Manufacturing Company, Cincinnati, Ohio, a corporation of Ohio Application February 8, 1933. Serial No. 655,791

10 Claims. (Cl. 53—6)

This invention relates to improvements in baking equipment.

An object of the invention is to provide improved means for the baking of so called square bread loaves.

Another object is to provide an inexpensive yet practical and durable bake pan structure designed to uniformly shape the loaves during the baking operation.

A further object of the invention is to provide an improved cover and means for associating same with a multiple pan unit, whereby a nesting of the units, with covers removed, is not interfered with.

The foregoing and other objects are attained by the means described herein and disclosed in the accompanying drawing, in which:

Fig. 1 is an isometric view of a baking structure embodying the invention, and showing the improved cover latched into position.

Fig. 2 is an isometric view of a multiple pan unit embodying the invention, the cover thereof being removed.

Fig. 3 is a cross sectional view taken on line 3—3 of Fig. 2.

Fig. 4 is an isometric view of the improved multiple pan unit cover, part being broken away.

Fig. 5 is an isometric view of a modified form of cover latch member.

In the drawing, 6 indicates a multiple unit of two or more baking pans adapted to be provided with an improved form of cover member 7. The several pans of the unit are indicated by the characters 8, 9 and 10, which pans are maintained in a co-planar parallel relationship by reason of their attachment to a common pan encircling band 12, which may be termed a reenforcing nesting band. The band is constituted of opposed side portions 13 and opposed end portions 14. The side portions of the encircling band may be secured to the opposite ends of adjacent pans in any suitable manner, such as by means of tongues 15 formed integrally with the material of the band and clamped upon the sheet material of the pan ends, as indicated in the patent of Lockwood No. 1,623,692.

Each of the connected pans of the unit is provided at its upper edge with an extending flange 16 upon which abuts the upper bead 17 of the reenforcing band. The purpose of this bead and flange abutment is to provide a sturdy support for the weight of superposed pan units when the units are stacked one upon the other. Each corner of the encircling band is provided with an outwardly extended rib 18 which projects sufficiently to cause the lower face 19 thereof to engage the upper corner 20 of subjacent similar pan units when the units are stacked or stored.

To the end portions 14 of the encircling band are riveted, or otherwise suitably secured, a pair of opposed latch keepers 21, only one of which is shown on the drawing, it being understood that a similar keeper is provided upon the rear end member 14. The keepers 21 are each in the form of an extending horizontal plate-like lug which lies in a plane parallel to that of the pan bottoms. The characters 22 indicate rivets or other suitable securing means which serve to fix the keeper to the end member 14. It is to be noted that the keeper is mounted sufficiently above the abutting portions 19 of the nesting limit lugs 18, so as not to interfere with normal pan nesting. The characters 23 indicate rivets or other suitable means for securing the end members 14 to the side members 13, and possibly to the outermost side of pan 8. The construction at the outer side of pan 10 is identical with that shown in Fig. 2.

The cover for the multiple pan unit of Fig. 2 preferably is constituted of a cover frame 24 which preferably is in the form of a continuous metal strip shaped to bound a rectangular cover sheet 25 of sheet metal of other suitable material, which is made into inverted pan form so as to have opposed end flanges 26 and opposed side flanges 27. The flanges preferably are secured to the side and end portions of the band 24 by means of rivets or suitable securing fasteners. The lower circumferential edge of the encircling band 24 is provided with an arcuate convex bead 28 that is adapted to cooperate with a complementarily arcuate channel 29 of a sliding latch member 30. The cooperating parts 28 and 29 serve to guide the latch member 30 in its longitudinal movement to operative and inoperative positions and to provide for proper frictional resistance against accidental displacement of the latch member from the operative position shown in Fig. 1.

It will be noted that the opposite ends of the cover member are notched as at 31, to receive the horizontal lug or keeper 21, and that by sliding the latch member 30 to the right, the latch bar portion 32 thereof serves to close the notch and thereby maintain the lug within the opening bounded by the walls of the notch and by the latch bar 32.

The slidable latch member may be provided with a suitable handle 33 projecting angularly from the body portion, and in order to maintain the arcuate channel 29 upon the arcuate convexity 28 of the frame member, the latch member 30 may be longitudinally slotted as at 34 for reception of a rivet or stud 35 that is mounted upon the frame member 24. The stud may be maintained within the slot by means of an enlarged head 36 on the lug, which head may be provided by securing a common washer upon the outer end of the stud or rivet 35. As is readily apparent from the disclosure of Fig. 1, the latch means at opposite sides or ends of the pan structure, may be identical in form.

The latch member disclosed in Fig. 5 is identical with that of Fig. 4, except for the provision of an additional slot 340 and extended channel 290. It is at once apparent that the use of the latch member of Fig. 5 would require a second retaining lug structure 35—36 at a location opposite that shown in Fig. 4. Attention is directed to the inwardly turned flange 38 of Fig. 3, which flange provides for an air space 39 between the pan walls 60 and the band portion 14, to obviate the undesirable uneven baking resulting from double thickness of metal along the pan sides. This flange serves also to afford a slight flexibility of the keeper 21, so that projection of the latch bar 32 to a position below the lug, may be facilitated even though the lug is deliberately located so as to be struck by the forward end 40 of the latch bar. The forward end preferably is chamfered, as at 41, to insure ready disposition of the latch bar beneath the lug. This construction will be found to effectively hold the cover in tight engagement with the top edges of the pans, so that the force of the expanding dough, during baking, may not distort the cover and permit the dough to exude from the resulting space between the cover and the top edges of the pans.

It is to be understood that various modifications and changes may be made in the structural details of the device, without departing from the spirit of the invention.

What is claimed is:

1. Baking equipment comprising in combination a unit of two or more connected baking pans, a cover for the unit, and means including a keeper and a bodily slidable latch member on the unit and on the cover, for holding the cover in position atop the pans.

2. Baking equipment comprising in combination a unit of two or more connected baking pans, a cover for the unit, and means at opposite ends of the cover for holding the cover in position atop the pans, at least one of said means comprising a latch keeper extending from the unit and a cooperative latch member mounted upon the cover for longitudinal sliding movement to a position in engagement with the keeper.

3. Baking equipment comprising in combination a unit of two or more connected baking pans, a reenforcing member secured to the pans and extending across opposite ends of the unit, latch keepers on the reenforcing members and disposed for extension from said opposite ends of the unit, means associated with the unit for limiting nesting of the unit within another unit said keepers being located to preclude interference thereof with the nesting of the units, a cover for the unit and comprising notched end portions the notches of which are located for reception of the latch keepers, and slidable latch members disposed adjacent to the notches and movable to operative positions for maintaining the keepers within the notches.

4. Baking equipment comprising in combination a unit of two or more connected baking pans, a reenforcing member secured to the pans and extending across opposite ends of the unit, latch keepers on the reenforcing members and disposed for extension from said opposite ends of the unit, a cover for the unit and comprising notched end portions the notches of which are located for reception of the latch keepers, and slidable latch members disposed adjacent to the notches and movable to operative positions for maintaining the keepers within the notches.

5. Baking equipment comprising in combination a unit of two or more connected baking pans, a reenforcing member secured to the pans and extending across opposite ends of the unit, latch keepers in the form of flat lugs secured upon the reenforcing members and disposed for extension from said opposite ends of the unit, a cover for the unit and comprising notched end portions the notches of which are located for reception of the flat lugs, a bead on each of said end portions and extending parallel to the plane of the cover in the vicinity of the notches, slidable latch members disposed adjacent to the notches and mounted upon the said end portions of the cover, and a channel in each latch member conforming with the shape of the beads for guiding said latch members in their movement to the operative position wherein they enclose the lugs within the notches.

6. As a new article of manufacture a multiple bake pan unit comprising a reenforcing means arranged to hold the pans in predetermined relationship, said reenforcing means having opposed portions supported above the pan bottoms, means on said opposed portions for limiting the extent to which the unit may be nested with another and substantially similar unit, and a latch keeper in the form of a flat plate-like lug, lying in a plane parallel to the pan bottoms, and extending outwardly from each of said opposed portions of the reenforcing means.

7. As a new article of manufacture a multiple bake pan unit cover comprising in combination a cover sheet and an encircling reenforcing band therefor, and opposed latch means each longitudinally shiftable along the band for engagement with a pan unit part.

8. As a new article of manufacture a multiple bake pan unit cover comprising in combination a cover sheet and a reenforcing band therefor, said reenforcing band being notched at a plurality of locations, and slidable latch members including means for substantially closing the open side of each notch and thereby transforming the notches into substantially completely bounded perforations.

9. As a new article of manufacture, a sliding latch member comprising a longitudinal body portion having opposite ends, one of said ends being turned at substantially a right angle to the body portion to provide a handle element, the other end being developed into a comparatively narrow latch bar portion, the intermediate portion of the body being provided with at least one elongated perforation extended in the general direction of extension of the latch bar portion.

10. As a new article of manufacture, a sliding latch member comprising a longitudinal substantially flat body portion having opposite ends, a channel bead formed along one longitudinal edge of the body portion so as to form a longitudinal concavity at the rear of the body portion, a substantially flat slotted element of lesser length than the channel bead, the slot thereof being extended in the general direction of extension of the longitudinal concavity, and an angularly turned end on the slotted element shaped to provide an actuating handle.

ELMER H. CHANDONIA.